US010567410B2

(12) United States Patent
Kuperman et al.

(10) Patent No.: US 10,567,410 B2
(45) Date of Patent: Feb. 18, 2020

(54) DETERMINING THE MALICIOUSNESS OF EXECUTABLE FILES USING A REMOTE SANDBOX ENVIRONMENT

(71) Applicant: Cujo LLC, El Segundo, CA (US)

(72) Inventors: Leonid Kuperman, Tarzana, CA (US); Yuri Frayman, Miami, FL (US); Einaras von Gravrock, Redondo Beach, CA (US); Gabor Takacs, Gyor (HU)

(73) Assignee: CUJO LLC, El Segundo, CA (US)

( * ) Notice: Subject to any disclaimer, the term of this patent is extended or adjusted under 35 U.S.C. 154(b) by 155 days.

(21) Appl. No.: 15/909,958

(22) Filed: Mar. 1, 2018

(65) Prior Publication Data

US 2018/0253550 A1 Sep. 6, 2018

Related U.S. Application Data

(60) Provisional application No. 62/477,363, filed on Mar. 27, 2017, provisional application No. 62/477,391, filed on Mar. 27, 2017, provisional application No. 62/465,304, filed on Mar. 1, 2017.

(51) Int. Cl.
*H04L 29/06* (2006.01)
*G06N 20/00* (2019.01)
(Continued)

(52) U.S. Cl.
CPC .......... *H04L 63/1425* (2013.01); *G06F 15/76* (2013.01); *G06F 21/53* (2013.01);
(Continued)

(58) Field of Classification Search
CPC ............. H04L 63/1425; H04L 63/0236; H04L 63/102; H04L 63/1433; H04L 43/062;
(Continued)

(56) References Cited

U.S. PATENT DOCUMENTS 8,612,971 B1 * 12/2013 Fitzgerald ........... G06F 9/45533
718/1
8,959,609 B1 * 2/2015 Newstadt ............ H04L 63/0884
726/9
(Continued)

OTHER PUBLICATIONS

PCT International Search Report and Written Opinion, PCT Application No. PCT/US18/20549, dated Jul. 11, 2018, 19 pages.
(Continued)

*Primary Examiner* — Ghodrat Jamshidi
(74) *Attorney, Agent, or Firm* — Fenwick & West LLP

(57) ABSTRACT

The behavior analysis engine detects malicious executable files that are being downloaded by networked devices in the local network by executing the executable files in a sandboxing environment operating on the behavior analysis engine. The network traffic hub identifies network communications that are transmitted through the local network that contain executable files. The network traffic hub sends the executable file to the behavior analysis engine and the behavior analysis engine executes the executable file in a sandboxing environment that replicates the networked device that was downloading the executable. The behavior analysis engine extracts execution features from the execution of the executable file and applies an execution model to the execution features to determine a confidence score for the executable file. The behavior analysis engine uses the confidence score to provide instructions to the network traffic hub as to whether to allow the networked device to download the executable.

18 Claims, 6 Drawing Sheets

US 10,567,410 B2
Page 2

(51) Int. Cl.
*G06F 15/76* (2006.01)
*H04L 12/24* (2006.01)
*G06F 21/55* (2013.01)
*G06F 21/53* (2013.01)
*H04L 12/26* (2006.01)

(52) U.S. Cl.
CPC ........... *G06F 21/554* (2013.01); *G06N 20/00* (2019.01); *H04L 41/145* (2013.01); *H04L 63/0236* (2013.01); *H04L 63/102* (2013.01); *H04L 63/1433* (2013.01); *H04L 63/1466* (2013.01); *H04L 41/16* (2013.01); *H04L 43/026* (2013.01); *H04L 43/062* (2013.01)

(58) Field of Classification Search
CPC ... H04L 41/145; H04L 63/1466; H04L 41/16; H04L 43/026; G06N 20/00; G06F 21/53; G06F 15/76; G06F 21/554
See application file for complete search history.

(56) References Cited

U.S. PATENT DOCUMENTS

| | | | |
|---|---|---|---|
| 9,104,867 B1 | 8/2015 | Thioux et al. | |
| 9,413,774 B1* | 8/2016 | Liu | H04L 63/1416 |
| 9,749,336 B1* | 8/2017 | Zhang | H04L 63/14 |
| 2009/0094175 A1 | 4/2009 | Provos et al. | |
| 2010/0058473 A1 | 3/2010 | Breitenbacher | |
| 2011/0023115 A1* | 1/2011 | Wright | G06F 21/552 726/22 |
| 2011/0185013 A1* | 7/2011 | Obata | G06F 8/61 709/203 |
| 2013/0097706 A1 | 4/2013 | Titonis et al. | |
| 2013/0254884 A1 | 9/2013 | Dalcher et al. | |
| 2014/0033304 A1* | 1/2014 | Lewis | G06F 21/53 726/22 |
| 2014/0373147 A1 | 12/2014 | Seinfeld et al. | |
| 2015/0089647 A1* | 3/2015 | Palumbo | H04L 63/145 726/23 |
| 2016/0239287 A1* | 8/2016 | Lim | G06F 21/51 |
| 2016/0269429 A1* | 9/2016 | Martini | H04L 63/1416 |
| 2016/0292420 A1* | 10/2016 | Langton | G06F 21/53 |
| 2016/0330215 A1 | 11/2016 | Gafni et al. | |
| 2016/0335435 A1* | 11/2016 | Schmidtler | G06F 21/565 |
| 2016/0379125 A1* | 12/2016 | Bordawekar | G06N 7/005 706/12 |
| 2018/0048647 A1* | 2/2018 | Favila | H04W 4/70 |
| 2019/0215301 A1* | 7/2019 | Abdulhayoglu | G06F 21/53 |

OTHER PUBLICATIONS

PCT Invitation to Pay Additional Fees, PCT Application No. PCT/US18/20549, dated May 2, 2018, 3 pages.

* cited by examiner

DETERMINING THE MALICIOUSNESS OF EXECUTABLE FILES USING A REMOTE SANDBOX ENVIRONMENT

CROSS REFERENCE TO RELATED APPLICATION

This application claims the benefit of U.S. Provisional Application No. 62/465,304, filed Mar. 1, 2017, U.S. Provisional Application No. 62/477,363, filed Mar. 27, 2017, and U.S. Provisional Application No. 62/477,391, filed Mar. 27, 2017, which are incorporated by reference in their entirety.

This application is related to U.S. patent application Ser. No. 14/948,160, filed Nov. 20, 2015, and titled "Network Security Analysis for Smart Appliances", the contents of which are hereby incorporated by reference.

BACKGROUND

Networked devices are vulnerable to malicious behavior from malicious actors on the Internet. For example, a user of a networked device may accidentally select a malicious network address (e.g., a phishing uniform resource locator or "URL") or may download a malicious executable file that steals the user's sensitive data from the networked device. Some networked devices can execute anti-virus software, however anti-virus software that is executed on the networked device is not sufficiently sophisticated or adaptable to address changing threats to networked devices. Furthermore, anti-virus software can be resource intensive and may reduce the performance of the networked device that executes the software, or may be infeasible for networked devices without fully-fledged computational capabilities, such as smart appliances.

BRIEF DESCRIPTION OF THE DRAWINGS

The disclosed embodiments have advantages and features that will be readily apparent from the detailed description, the appended claims, and the accompanying figures (or drawings). A brief introduction of the figures is below.

DETAILED DESCRIPTION

Figure 1:
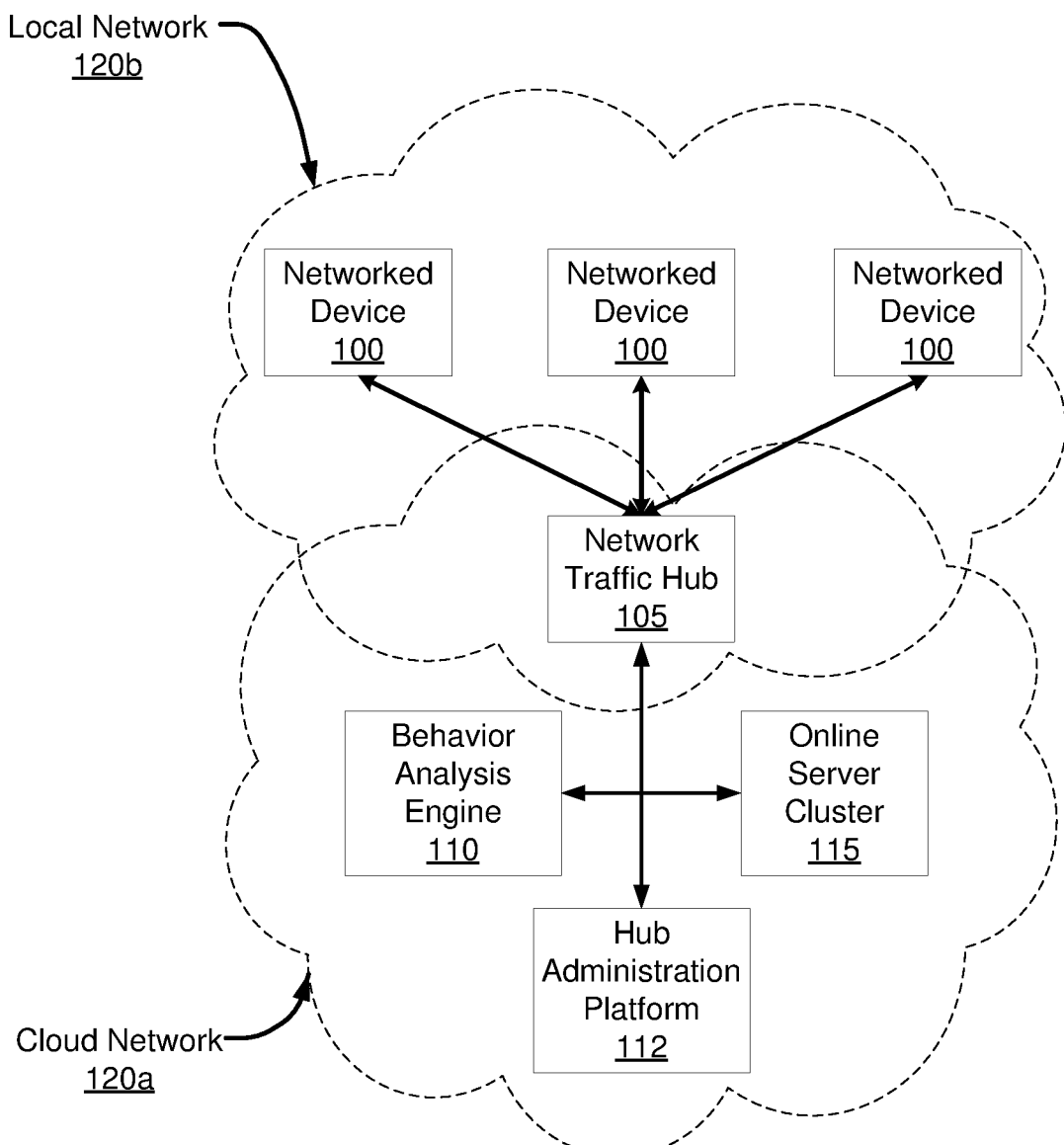
FIG. 1 illustrates an example system environment for a network traffic hub and a behavior analysis engine, in accordance with some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A behavior analysis engine and a network traffic hub operate in conjunction to detect malicious behavior in a local network. The behavior analysis engine can detect malicious executable files that are being downloaded by networked devices in the local network by executing the executable files in a sandboxing environment operating on the behavior analysis engine. The network traffic hub identifies network communications that are transmitted through the local network that contain executable files. The network traffic hub sends the executable file to the behavior analysis engine and the behavior analysis engine executes the executable file in a sandboxing environment that replicates the networked device that was downloading the executable. The behavior analysis engine extracts execution features from the execution of the executable file and applies an execution model to the execution features to determine a confidence score for the executable file. The confidence score represents the execution model's certainty that the executable file is malicious. The behavior analysis engine uses the confidence score to provide instructions to the network traffic hub as to whether to allow the networked device to download the executable.

The behavior analysis engine can also detect malicious network addresses that are sent to networked devices in the local network. The network traffic hub identifies network communications that are transmitted through the local network that contain network addresses. The network traffic hub transmits (or sends) the network address to the behavior analysis engine and the behavior analysis engine extracts network address features from the network address. The behavior analysis engine then applies an execution model to the execution features to determine a confidence score for the network address that represents the execution model's certainty that the network address is malicious. The behavior analysis engine uses the confidence score to provide instructions to the network traffic hub as to whether to allow the networked device to receive the network address.

The behavior analysis engine can identify malicious entities based on connections between the entity and other entities. The behavior analysis engine receives an entity from the network traffic hub and identifies entities that are connected to the entity within a threshold degree of separation. The behavior analysis engine applies a recursive process to the entity whereby the behavior analysis engine determines whether an entity is malicious based on whether its connections within a threshold degree of separation are malicious. The behavior analysis engine uses the maliciousness of the entities' connections to determine whether the entity is malicious and, if the entity is malicious, the behavior analysis engine may instruct the network traffic hub to block network communications associated with the malicious entity.

Furthermore, the behavior analysis engine can condense stored machine-learned models and transmit the condensed versions of the machine-learned models to the network traffic hub to be applied in the local networks. When the behavior analysis engine receives new data that can be used to further train a machine-learned model, the behavior analysis engine updates the machine-learned model and generates a condensed-version of the machine-learned model. The condensed-version of the machine-learned model may be more resource efficient than the machine-learned model while capable of making similar or the same decisions as the machine-learned model. The behavior analysis engine transmits the condensed version of the machine-learned model to the network traffic hub and the network traffic hub uses the condensed-version of the machine-learned model to identify malicious behavior in the local network.

Example System Environment

FIG. 1 illustrates an example system environment for a network traffic hub 105 and a behavior analysis engine 110, in accordance with some embodiments. The functionality of the modules in FIG. 1 can be performed by additional, fewer, or different modules and the functionality of the modules can be divvied between modules differently from how it is described below. The networked computing environment in FIG. 1 shows one or more networked devices 100, a network traffic hub 105, a behavior analysis engine 110, a hub administration platform 112, an online server cluster 115, a cloud network 120a, and a local network 120b.

A networked device 100 can be a personal or mobile computing device, such as a smartphone, a tablet, a laptop computer, or a desktop computer. A networked device 100 may also be a smart appliance with a limited level of intelligence and processing capabilities. A networked device 100 can be equipped with a computing processor, short-term and long-term (or persistent) memory, and a networking interface that allows the networked device 100 to communicate with other devices on the local network 120b or the Internet. A networked device 100 can further include a user interface that allows a user of the networked device 100 to take advantage of the networked device's 100 computational and networking capabilities.

The network traffic hub 105 collects information about the local network 120b, including data about the network traffic through local network 120b and data identifying the networked devices 100 in the local network 120b. The network traffic hub 105 is also capable of receiving traffic control instructions from the behavior analysis engine 110 and processing network traffic through the local network 120b based on the traffic control instructions. Processing the network traffic through the local network 120b can include restricting where network traffic can travel, blocking network traffic from entering the local network 120b, redirecting a copy of network traffic packets or features of those packets to the behavioral analysis engine 110 for analysis for malicious behavior, or quarantining the network traffic to be reviewed by a user or network administrator. In some embodiments, the functionality of the network traffic hub 105 is performed by one or more devices that are a part of the local network 120b. In other embodiments, some or all of the functionality of the network traffic hub 105 is performed in the cloud network 120a by the online server cluster 115.

The network traffic hub 105 may be configured to monitor traffic that travels through the local network 120b. The network traffic hub 105 can be connected to the local network 120b using a wired connection (e.g. via an Ethernet cable connected to a router) or using a wireless connection (e.g. via a Wi-Fi connection). In some embodiments, the network traffic hub 105 can comprise multiple devices in the local network 120b that, in conjunction, monitor all traffic that flows through the local network 120b.

In some embodiments, the network traffic hub 105 performs the function of a router in the local network 120b. The network traffic hub 105 may alternatively intercept traffic in the local network 120b by signaling to the networked devices 100 that the network traffic hub 105 is a router. In some embodiments, the network traffic hub 105 replaces the default gateway of the local network 120b with its own internet address. For example, the network traffic hub 105 may replace the default gateway of the local network 120b using an address resolution protocol (ARP) or dynamic host configuration protocol (DHCP) man-in-the-middle attack. To perform the man-in-the-middle attack, the network traffic hub 105 may use address resolution protocol (ARP) spoofing/cache poisoning to replace the default gateway. An address resolution protocol (ARP) announcement is sent to signal the networked devices 100 to transmit network traffic to the network traffic hub 105. In some embodiments, the network traffic hub 105 uses an internet control message protocol (ICMP) attack to replace the default gateway. The network traffic hub 105 also may use a DHCP attack or port stealing to replace the default gateway.

In some embodiments, the local network 120b can be structured such that all network traffic passes through the network traffic hub 105, allowing the network traffic hub 105 to physically intercept the network traffic. For example, the network traffic hub 105 may serve as a bridge through which all network traffic must travel to reach the router of the local network 120b.

The behavior analysis engine 110 is configured to receive network traffic data and device identification data from the network traffic hub 105. The behavior analysis engine uses that data to determine whether any of the networked devices 100 in the local network 120b are exhibiting malicious behavior. If the behavior analysis engine 110 is confident that a networked device 100 is exhibiting malicious behavior, then the behavior analysis engine 110 sends traffic control instructions to the network traffic hub 105 to block traffic to the networked device 100 to prevent the malicious behavior from impacting the security of the local network 120b. In some embodiments, the behavior analysis engine 110 is a part of a cloud network 120a and is stored and executed by an online server cluster 115.

Developers (or third-party administrators) of the network traffic hub 105 may communicate with the network traffic hub 105 to receive diagnostic information for troubleshooting purposes or to update the firmware or software on the network traffic hub 105. In some embodiments, the developers or third-party administrators may use a secure shell (SSH) to communicate with the network traffic hub 105 using the internet address of the network traffic hub 105. In other embodiments, the developers may use the hub administration platform 112 to communicate with the network traffic hub 105 for better load-balancing and security. In these embodiments, a developer can request that the hub administration platform 112 send a security key to the network traffic hub 105. The hub administration platform 112 sends the security key to the network traffic hub 105 and adds the internet address of the network traffic hub 105 to a list of internet addresses that are allowed to communicate with the hub administration platform 112 (e.g., a firewall). Upon receiving the security key from the hub administration platform 112, the network traffic hub 105 connects to the hub administration platform 112 to communicate with the developer. After the communication between the network traffic hub 105 and the developer is finished, the hub administration platform 112 removes the internet address of the network traffic hub 105 from the list of internet addresses and the security key expires.

The online server cluster 115 is configured to store data, perform computations, and transmit data to other devices through cloud network 120a. The online server cluster 115 may comprise a single computing device, or a plurality of computing devices configured to allow for distributed computations. In some embodiments, the behavior analysis engine 110 is stored and executed by the online server cluster 115. In some embodiments, certain functionality of the network traffic hub 105 is performed on the online server cluster 115. In some embodiments, the online server cluster 115 stores data that is used by the behavior analysis engine 110 and the network traffic hub 105.

The networked computing environment in FIG. 1 may be grouped around the network traffic hub 105. In some embodiments, the network traffic hub 105 is part of cloud network 120a. In other embodiments, the network traffic hub 105 is part of a local network 120b. The cloud network 120a comprises the behavior analysis engine 110, the online server cluster 115 and, in some embodiments, the network traffic hub 105. The cloud network 120a is connected to the local network 120b via the internet. The local network 120b comprises the networked devices 100. In some embodiments, some or all of the functionality of the network traffic hub 105 is performed by a device in the local network 120b. The local network 120b may be used for a number of purposes, including a home network or a network used by a business. The local network 120b is connected to the internet, allowing devices within the local network 120b, including networked devices 100, to communicate with devices outside of the local network 120b. The local network 120b is connected to cloud network 120a via the internet. The local network 120b may be a private network that may require devices to present credentials to join the network, or it may be a public network allowing any device to join. In some embodiments, other devices, like personal computers, smartphones, or tablets, may join local network 120b.

The cloud network 120a and the local network 120b may comprise any combination of local area and wide area networks, using both wired and wireless communication systems. In some embodiments, the cloud network 120a and the local network 120b use standard communications technologies and protocols. For example, the cloud network 120a and the local network 120b may include communication links using technologies such as Ethernet, 802.11, worldwide interoperability for microwave access (WiMAX), 3G, 4G, code division multiple access (CDMA), digital subscriber line (DSL), etc. Data exchanged over the cloud network 120a and the local network 120b may be represented using any suitable format, such as hypertext markup language (HTML) or extensible markup language (XML). In some embodiments, all or some of the communication links of the cloud network 120a and the local network 120b may be encrypted using any suitable technique or techniques.

Sandboxing Intercepted Executable Files

Figure 2:
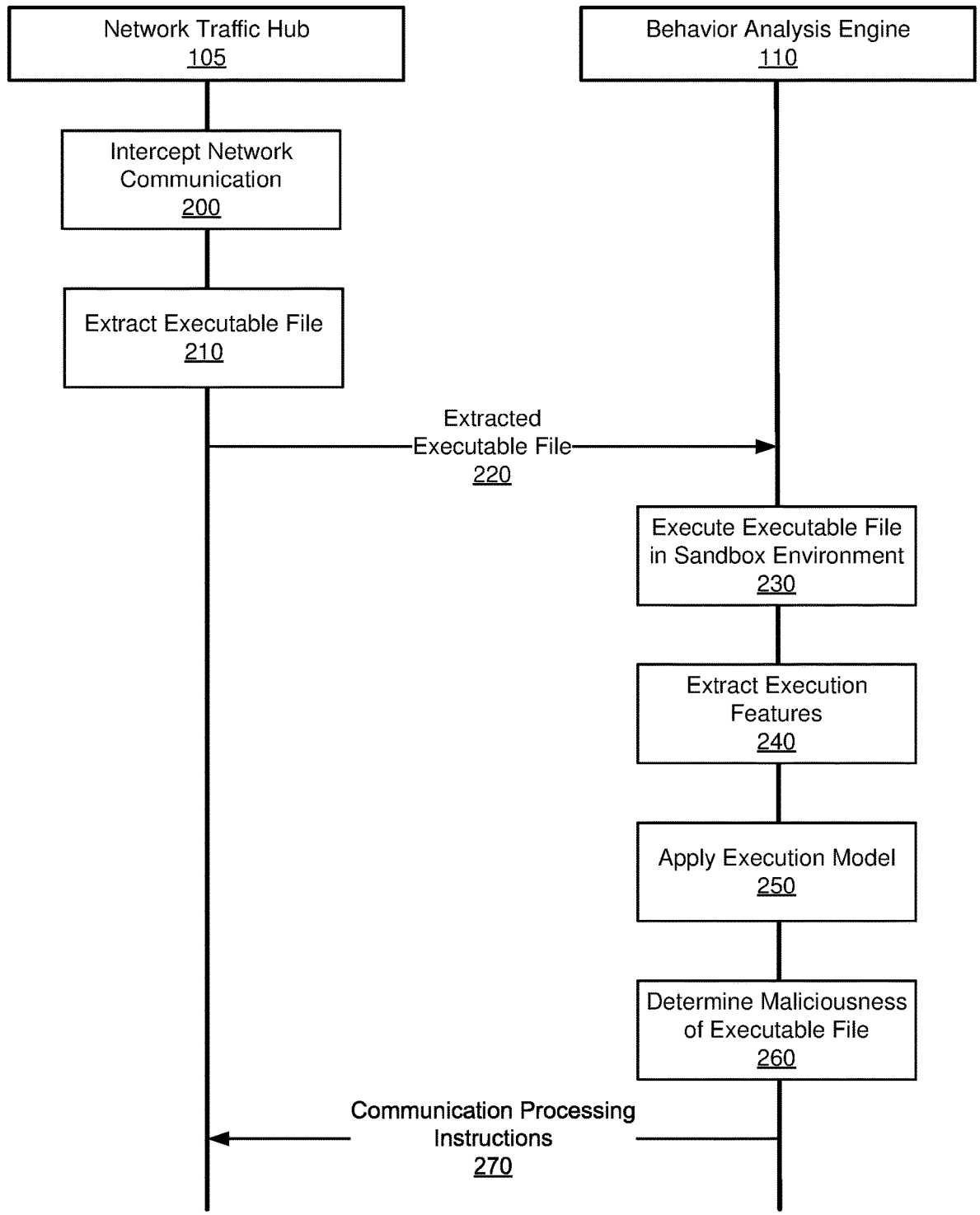
FIG. 2 is a sequence diagram for a method for using a sandbox environment operated by the behavior analysis engine to evaluate the maliciousness of executable files received by networked devices in a local network, in accordance with some embodiments.

FIG. 2 is a sequence diagram for a method for using a sandbox environment operated by the behavior analysis engine 110 to evaluate the maliciousness of executable files received by networked devices 100 in a local network 120b, in accordance with some embodiments. Alternative embodiments may include more, fewer, or different steps from those illustrated in FIG. 2, and the steps may be performed in a different order from that illustrated in FIG. 2.

The network traffic hub 105 intercepts 200 network communications between networked devices 100 in the local network 120b and devices outside of the local network 120b. In some cases, a network communication with an executable file may be transmitted to a networked device 100 within the local network 120b. An executable file is a file that is executable by the networked device 100 either independently or in response to a user's instruction to execute the executable file. The network traffic hub 105 intercepts 200 the network communication and determines whether the network communication includes an executable file. The network traffic hub 105 may extract 210 the executable file from the network communication. The network traffic hub 105 transmits 220 the executable file to the behavior analysis engine 110 for analysis. The network traffic hub 105 may send the extracted executable file or may transmit the entire network communication to the behavior analysis engine 110.

The behavior analysis engine 110 analyzes the executable file by executing 230 the executable file in a sandbox environment. The sandbox environment is a virtual environment created by the behavior analysis engine 110 that allows the executable file to execute while protecting the executable file from accessing secure information. In some embodiments, the sandbox environment uses a virtual machine to execute the executable file. The behavior analysis engine 110 may configure the sandbox environment execute the executable file in a similar manner to how the executable file would be executed by the networked device 100. For example, the sandbox environment may replicate an operating system executed by the networked device 100 when executing the executable file. The sandbox environment also may be configured to avoid detection by a malicious executable file as a sandbox environment by replicating a networked device 100 that has been used by a user. For example, the behavior analysis engine 110 may configure the sandbox environment to:

have an actual network connection to the Internet;
  store sample files in directories within the sandbox environment;
  install programs that may be executed on a networked device 100, such as multiple web browsers;
  store non-empty web browser caches and cookies; or
  have a realistic screen resolution that a user may actually establish for a networked device 100.

The behavior analysis engine 110 extracts 240 execution features from the execution of the executable file in the sandbox environment. The execution features describe characteristics of the execution of the executable file. For example, the execution features can include:

network addresses with which the executable file communicates;
  protocols used by the executable file;
  registry keys used by the executable files;
  whether the executable file opens a window; or
  the dimensions of any window opened by the executable file.

The behavior analysis engine 110 applies 250 an execution model to the execution features to determine whether the executable file is malicious. The execution model may be a machine-learned model that is trained based on execution features of known-malicious executable files and knownnon-malicious executable files. These known-malicious executable files and known-non-malicious executable files are thus used as labeled training data for the execution model. Additionally, the execution model may include pre-determined rules for identifying malicious behavior. For example, the execution model may include a rule that an executable file that attempts to access sensitive data or data that the executable file is not supposed to access is deemed to be malicious.

The execution model outputs a confidence score representing the execution model's certainty that the executable file is malicious and the behavior analysis engine 110 determines 260 the maliciousness of the executable file based on the confidence score. In some embodiments, the behavior analysis engine 110 uses a threshold for the confidence score to determine whether the executable file is malicious. The behavior analysis engine 110 transmits 270 communication processing instructions to the network traffic hub 105 that specify how the network traffic hub 105 should process the network communication that contains the executable file. For example, if the confidence score exceeds the threshold, the behavior analysis engine 110 may instruct the network traffic hub to block the network communication from being downloaded or may prompt the user of the networked device 100 to confirm that the executable file should be downloaded.

The network traffic hub 105 may quarantine the executable file from being transmitted to the networked device 100 until the network traffic hub 105 receives instructions from the behavior analysis engine 110 to allow the executable file to be transmitted to the networked device 100. In some embodiments, the network traffic hub 105 sends a redirect message to a web browser used by the networked device 100 to download the executable file. The web browser may be redirected to a web page that explains that the executable file is being analyzed by the behavior analysis engine 110 and that may be updated when the behavior analysis engine 110 transmits communication processing instructions to the network traffic hub 105. Alternatively, the network traffic hub 110 may replace the executable file with a replacement file that, when executed, notifies the user that the executable file is being analyzed by the behavior analysis engine 110. The notification may allow the user to download the executable file from the behavior analysis engine 110 or the network traffic hub 105 if the behavior analysis engine 110 determines that the executable file is not malicious.

Detecting Malicious Network Addresses

Figure 3:
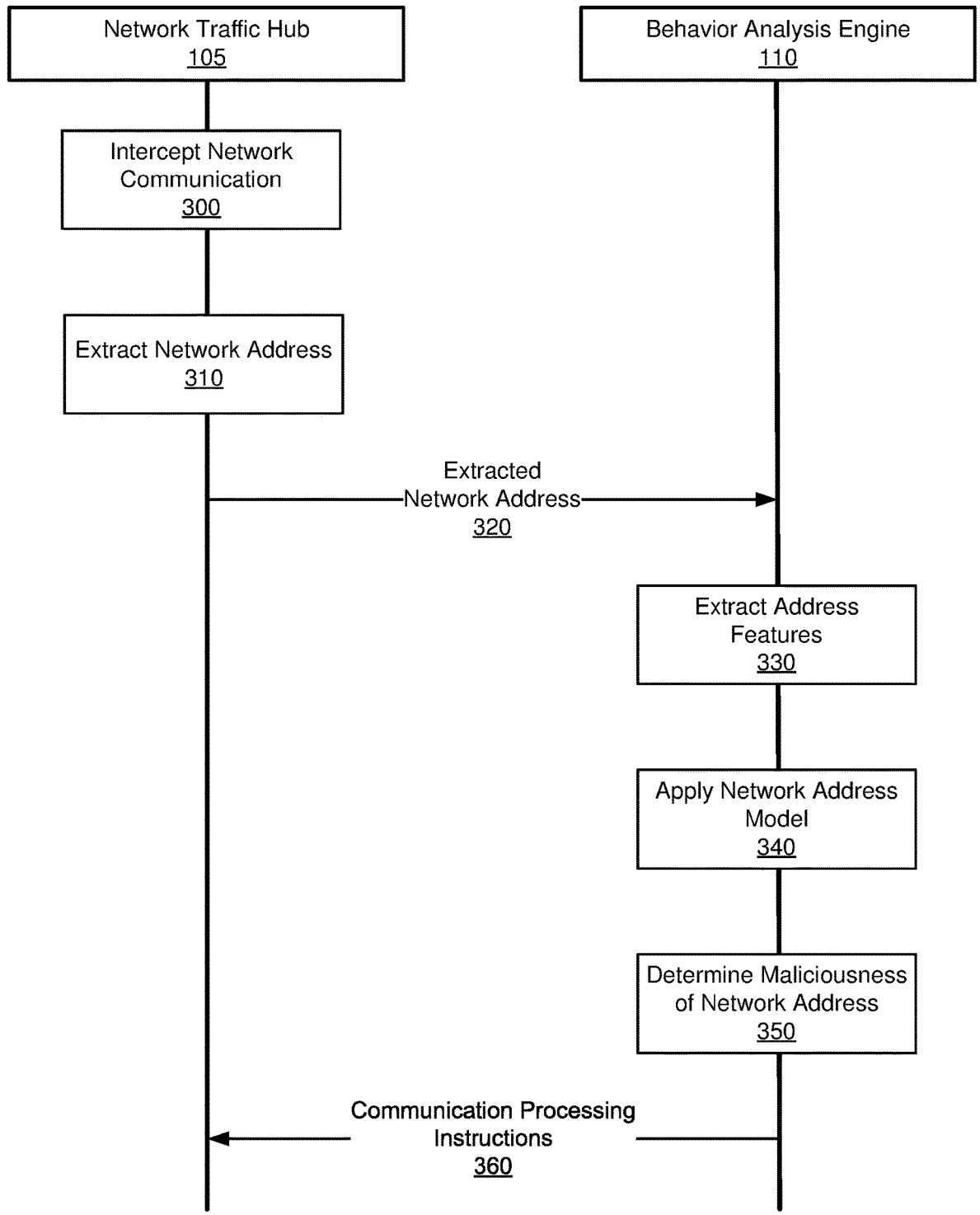
FIG. 3 is a sequence diagram for a method for identifying malicious network addresses that are sent to networked devices in a local network, in accordance with some embodiments.

FIG. 3 is a sequence diagram for a method for identifying malicious network addresses that are sent to networked devices 100 in a local network 120b, in accordance with some embodiments. Alternative embodiments may include more, fewer, or different steps from those illustrated in FIG. 3, and the steps may be performed in a different order from that illustrated in FIG. 3.

The network traffic hub 105 intercepts 200 network communications between networked devices 100 in the local network 120b and devices outside of the local network 120b. In some cases, a network communication with a network address may be transmitted to a networked device 100 within the local network 120b by a device outside of the local network 120b. A network address identifies an address of a device on the Internet with which the networked device 100 can communicate. For example, the network address may be a uniform resource locator or an IP address. The network traffic hub 105 intercepts 300 the network communication and determines whether the network communication includes a network address. The network traffic hub 105 may extract 310 the network address from the network communication. The network traffic hub 105 transmits 320 the network address to the behavior analysis engine 110 for analysis. The network traffic hub 105 may send the extracted network address or the entire network communication to the behavior analysis engine 110. The network traffic hub 105 also may transmit features describing aspects of the network communication aside from the network address (e.g., the origin or destination of the network communication).

The behavior analysis engine 110 extracts 330 network address features from the network address. The network address features describe characteristics of the network address. For example, the network address features can include:

whether the network address returns a redirect HTTP response code (302 or 301);
whether the network address is a recognized link from a link shortening service;
the top level domain of the network address;
whether the network address contains any special characters;
the Threat Intelligence score of domain of the network address;
the age of the domain of the network address;
whether the domain has a corresponding HTTPS certificate;
whether the domain uses a content delivery network;
a number of network addresses associated with a DNS record;
a geographic location associated with a network address;
certificate and TLS features of the network address;
content-based features that are collected by downloading content from the network address;

The behavior analysis engine 110 applies 340 a network address model to the network address features to determine whether the network address is malicious. For example, the network address model may determine whether the network address is a phishing URL. The network address model may be a machine-learned model that is trained based on network address features of known-malicious network addresses and known-non-malicious network addresses. In some embodiments, the known-malicious network addresses are obtained from known and verified sources for malicious network addresses and the known-non-malicious network addresses include network addresses for a set of global websites that receive heavy Internet traffic. These known-malicious network addresses and known-non-malicious network addresses are thus used as labeled training data for the network address model. Additionally, the network address model may include pre-determined rules for identifying malicious network addresses. For example, the network address model may deem a network address to be malicious if the network address is associated with an IP address or a domain that is known to be malicious.

The network address model outputs a confidence score representing the network address model's certainty that the network address is malicious and the behavior analysis engine 110 determines 350 the maliciousness of the network address based on the confidence score. In some embodiments, the behavior analysis engine 110 uses a threshold for the confidence score to determine whether the network address is malicious. The behavior analysis engine 110 transmits 360 communication processing instructions to the network traffic hub 105 that specify how the network traffic hub 105 should process the network communication that contains the network address. For example, if the confidence score exceeds the threshold, the behavior analysis engine 110 may instruct the network traffic hub to block the network communication from being downloaded or may prompt the user of the networked device 100 to confirm that the network address should be downloaded.

Identifying Malicious Entities

Figure 4:
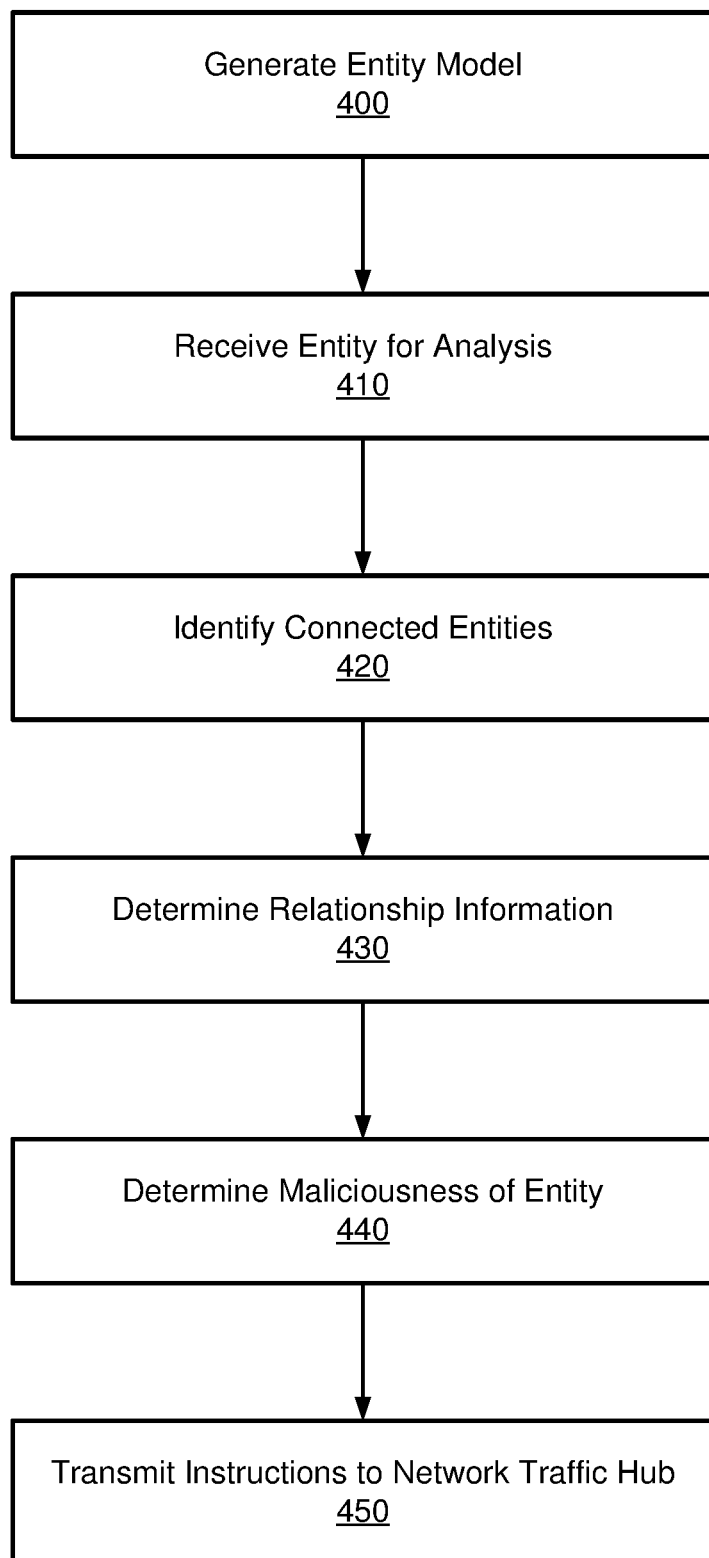
FIG. 4 is a flowchart for a method for identifying malicious entities based on the entities' relationships with other entities, in accordance with some embodiments.

FIG. 4 is a flowchart for a method for identifying malicious entities based on the entities' relationships with other entities, in accordance with some embodiments. Alternative embodiments may include more, fewer, or different steps from those illustrated in FIG. 4, and the steps may be performed in a different order from that illustrated in FIG. 4.

The behavior analysis engine 110 can use connections between entities to identify malicious entities that are analyzed by the behavior analysis engine 110. Entities are identifiers or aliases that represent actors in the Internet. For example, an entity can be a domain, a network address, an organization, or an individual or group of individuals that have been associated with malicious activity. The behavior analysis engine 110 generates 400 an entity analysis model that uses connections between entities to determine if a new entity is malicious. The behavior analysis engine 110 generates the entity analysis model using a set of known-malicious entities and a set of known-non-malicious entities. The set of known-malicious entities may be obtained from open source or commercial threat intelligence databases and the set of known-non-malicious entities may be obtained by collecting entities associated with popular websites. The behavior analysis engine 110 determines connections between the entities and stores the connections. A connection between entities represents that the entities were, at least at some point, associated with one another. For example, if an IP address is assigned to a particular domain, then the domain and the IP address would be connected. The behavior analysis engine 110 can determine the connections between entities using Whois lookups, reverse DNS lookups, or via OpenSLL handshakes with domains. Each connection may be associated with characteristics that describe the connection. For example, each connection may be associated with a weight, a connection type, or a timestamp or time range for when the connection was created or existed. In some embodiments, the behavior analysis engine 110 stores the entities as nodes in a graph and the connections between the entities are represented as edges between the nodes.

To train the entity model, the behavior analysis engine 110 generates relationship information for each of the entities used to train the entity model. The relationship information for an entity describes a set of entities that are within some degree of separation from the entity. The relationship information also describes connections of each of the entities in the set of entities and whether each of the entities in the set of entities is malicious. The behavior analysis engine 110 uses the relationship information for the known-malicious entities and the known-non-malicious entities to train the entity model. The behavior analysis engine 110 can thereby use the relationship information for the known-malicious entities and the known-non-malicious entities as labeled training data for the entity model.

The behavior analysis engine 110 can use the entity model to determine whether unknown entities are malicious. The behavior analysis receives 410 an entity from the network traffic hub 105 for analysis and identifies 420 entities that are connected to the received entity. The identified connected entities are entities that are connected to the received entity within some degree of separation. The behavior analysis engine 110 determines 430 relationship information for each of the connected entities. In some embodiments, to determine the relationship information for each of the connected entities, the behavior analysis engine 110 determines the maliciousness of each of the connected entities. The entity model uses a recursive process to a designated recursion depth to determine the maliciousness of the connected entities. The recursive process uses the maliciousness of entities connected to an entity to determine the maliciousness of the entity. If the maliciousness of a connected entity is unknown, the entity model performs the recursive process on the connected entity while decrementing the recursion depth. The entity model stops the recursion process when it reaches the recursion depth or when the entity model knows whether an entity under consideration is malicious. In some embodiments, if the entity model does not have enough information to determine whether an entity in the recursion process is malicious, the entity model assumes that the entity is not malicious.

As noted, the entity model uses the recursion process to determine 440 the maliciousness of the received entity. In some embodiments, the entity model outputs a confidence score representing the entity model's certainty that the network address is malicious and the behavior analysis engine 110 determines the maliciousness of the entity based on the confidence score. In some embodiments, the behavior analysis engine 110 uses a threshold for the confidence score to determine whether the entity is malicious. The behavior analysis engine 110 transmits 450 instructions to the network traffic hub 105 that specify how the network traffic hub 105 should handle network communications associated with the entity. For example, if the confidence score exceeds the threshold, the behavior analysis engine 110 may instruct the network traffic hub to block the network communication associated with the entity.

Generating Condensed Models for Distribution to Network Traffic Hubs

Figure 5:
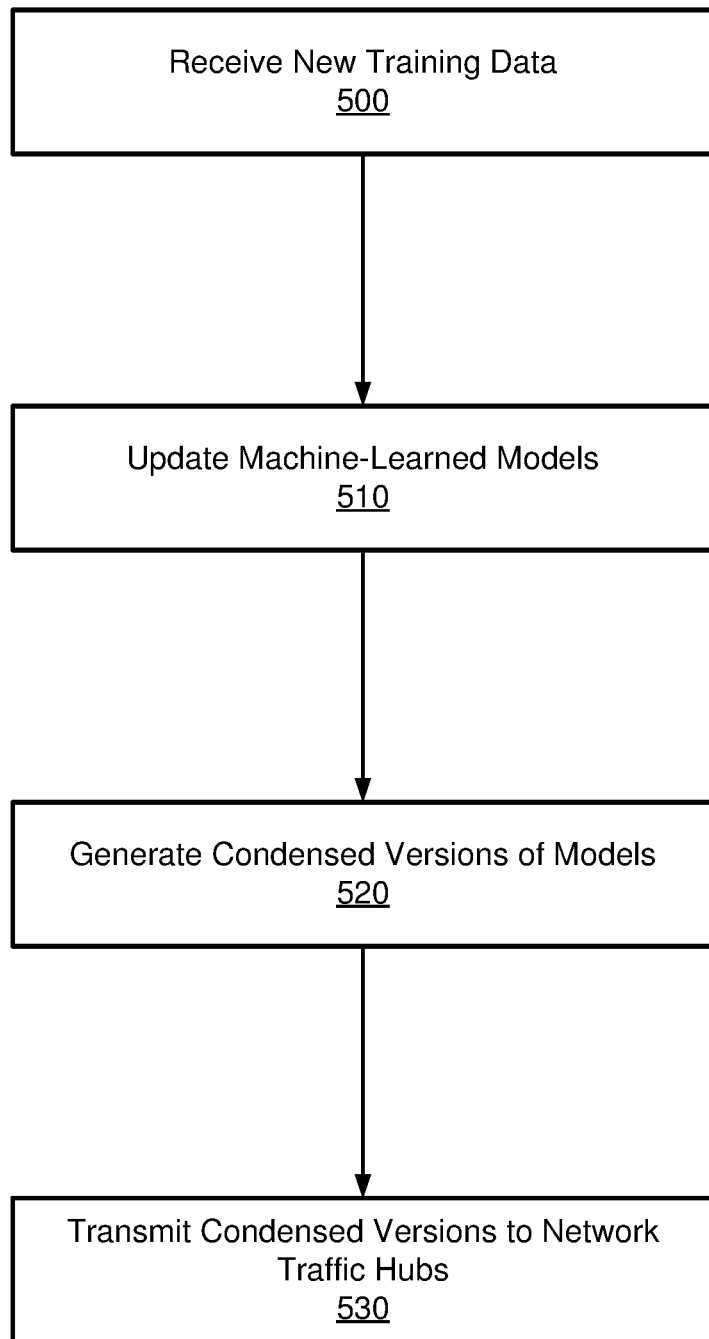
FIG. 5 is a flowchart for a method of generating condensed versions of machine-learned models for distribution to one or more network traffic hubs 105, in accordance with some embodiments.

FIG. 5 is a flowchart for a method of generating condensed versions of machine-learned models for distribution to one or more network traffic hubs 105, in accordance with some embodiments. Alternative embodiments may include more, fewer, or different steps from those illustrated in FIG. 5, and the steps may be performed in a different order from that illustrated in FIG. 5.

The behavior analysis engine 110 may store numerous machine-learned models that the behavior analysis engine 110 uses to detect malicious behavior in one or more local networks 120b that include network traffic hubs 105. The behavior analysis engine 110 may condense these machine-learned models into less-resource-intensive models that can be transmitted to the network traffic hubs 105 so that malicious behavior can be detected locally, rather than at the remote behavior analysis engine 110.

The behavior analysis engine 110 receives 500 new training data for at least one of a set of machine-learned models that the behavior analysis engine 110 uses for detecting malicious behavior. The new training data may be received from the network traffic hub 105 or may be received from human reviewers of situations where a machine-learned model is uncertain in determining whether behavior is malicious. The set of machine-learned models may include the execution model, the network address model, or the entity model. The behavior analysis engine 110 updates 510 one or more of the machine-learned model based on the received new training data. The new training data may be received from a network traffic hub 105 or from third-party systems that generate data describing malicious behavior.

The behavior analysis engine 110 generates 520 a condensed version of each of the machine-learned models of the set of machine-learned models. The condensed version of a machine-learned model is a restructured version of the machine-learned model that is capable of making the same or similar decisions to the machine-learned model based on the same input data. The condensed version of a machine-learned model may also be more resource efficient than the machine-learned model. For example, the condensed version may require less memory, less processing power, or fewer networking resources than the machine-learned model. In some embodiments, the condensed versions of the machined-learned models comprise one or more decision trees or a gradient boosting machine.

The behavior analysis engine 110 transmits 530 the condensed versions of the machine-learned models to the network traffic hubs 105 to identify malicious behavior within the local networks 120b containing the network traffic hubs 105. The network traffic hubs 105 may use the outputs from the condensed versions of the machine-learned models to block network traffic associated with malicious actors or to quarantine potentially malicious network traffic until a user has reviewed the network traffic. While the condensed version of the machine-learned models may be more efficient in execution, they may be more difficult or less efficient to update based on new training data received by the network traffic hub 105 or the behavior analysis engine 110. The network traffic hub 105 may receive updated replacements for the condensed versions of the machine-learned models from the behavior analysis engine 110 that have been updated with new training data received by the behavior analysis engine 110. Thus, the network traffic hub 105 stores up-to-date condensed versions of machine-learned models for detecting malicious behavior.

Example Machine Architecture

Figure 6:
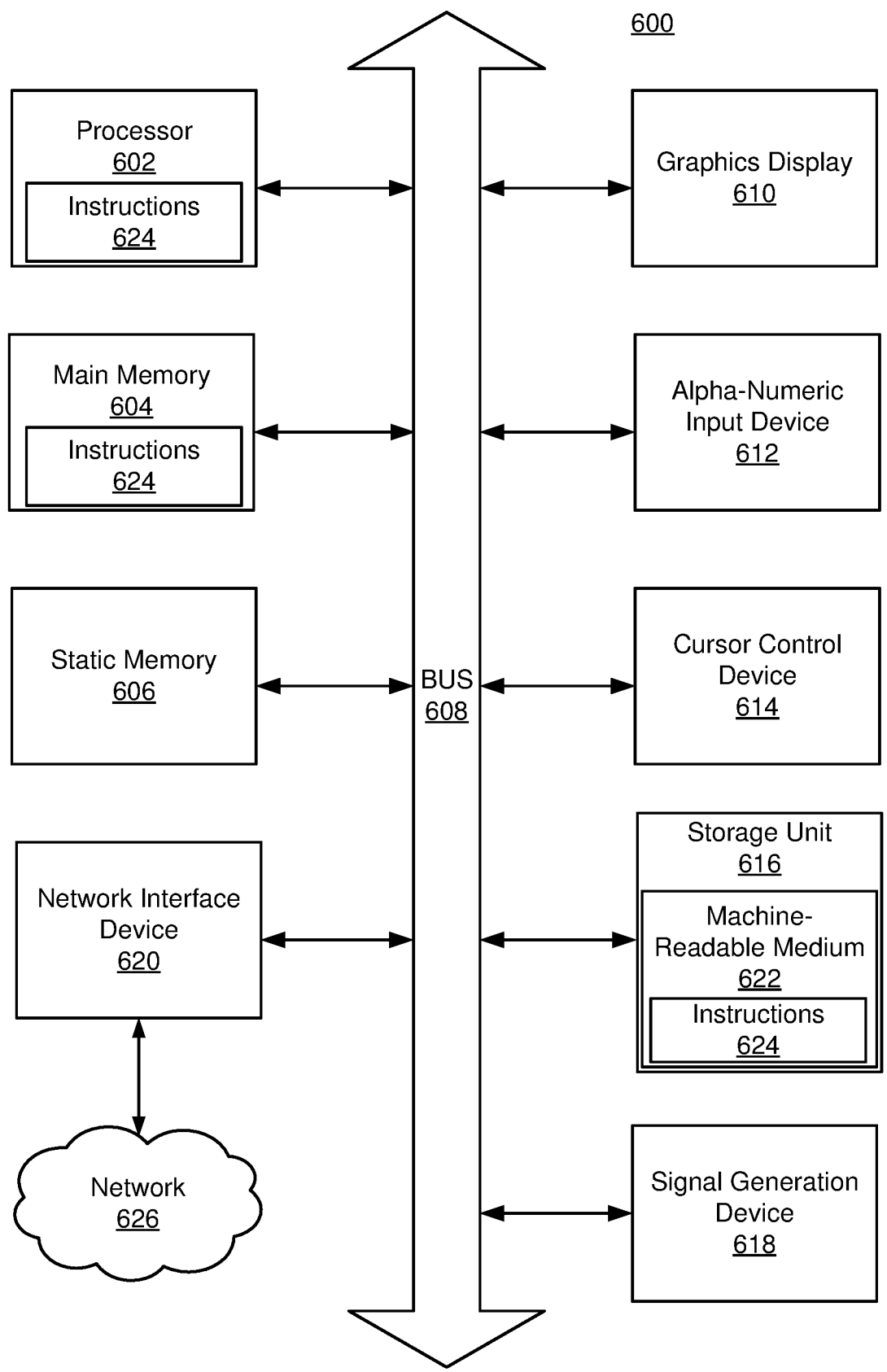
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The methods and systems for detecting malicious behavior as disclosed provides benefits and advantages that improved ability to detect malicious behavior in executable files downloaded by devices within a local network. By executing the executables in a remote sandboxing environment, more features of the executable can be determined than through static analysis and it can be done in real-time as executables are downloaded. The executable can also be analyzed without risking a user's private data. Additionally, the behavior analysis engine can more effectively identify malicious network addresses using a machine-learned model trained based on known-malicious and known-non-malicious network addresses, and can more effectively identify malicious entities by analyzing the relationships between an entity and entities connected to the entity within a particular degree of separation. Furthermore, by transmitting condensed versions of machine-learned models developed by the behavior analysis engine to network traffic hubs, the network traffic hub can analyze locally network traffic within a local network which allows the network traffic hub to more quickly analyze network traffic, rather than waiting for instructions from the behavior analysis engine.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2-5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting malicious behavior in local networks through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving, at a behavior analysis engine, an executable file from a network traffic hub in a local network as the executable file is being downloaded by a networked device in the local network;
    executing the executable file in a sandbox environment operated by the behavior analysis engine and configured to replicate an operating system running by the networked device that is downloading the executable file and to execute the executable file as the networked device would execute the executable file;
    extracting execution features from the execution of the executable file, the execution features corresponding to characteristics of the execution of the executable file;
    applying an execution model to the extracted execution features, the execution model to determine whether an executable file is malicious based on execution features of the executable file; and
    transmitting processing instructions to the network traffic hub based on the determination of whether the execution file is malicious.

2. The method of claim 1, further comprising:
    receiving a network communication associated with the executable file; and
    extracting the executable file from the network communication.

3. The method of claim 1, wherein the sandbox environment is configured based on device identification data received from the network traffic hub.

4. The method of claim 1, wherein the execution model comprises a machine-learned model.

5. The method of claim 4, wherein the execution model is trained based on execution features of a set of known-malicious executable files.

6. The method of claim 4, wherein the execution model is trained based on execution features of a set of known-non-malicious executable files.

7. The method of claim 1, wherein applying the execution model to the execution features comprises generating a confidence score based on the execution features, the confidence score representing a confidence of the execution model that the executable file is malicious.

8. The method of claim 7, wherein further comprising comparing the confidence score to a threshold confidence score.

9. The method of claim 1, further comprising, responsive to determining that the executable file is malicious, transmitting processing instructions to the network traffic hub to block the executable file from being downloaded by the networked device.

10. The method of claim 1, further comprising, responsive to determining that the executable file is not malicious, transmitting processing instructions to the network traffic hub to allow the executable file to be downloaded by the networked device.

11. A non-transitory computer-readable medium comprising instructions that, when executed by a processor, cause the processor to:
    receive, at a behavior analysis engine, an executable file from a network traffic hub in a local network as the executable file is being downloaded by a networked device in the local network;
    execute the executable file in a sandbox environment operated by the behavior analysis engine and configured to replicate an operating system running by the networked device that is downloading the executable file and to execute the executable file as the networked device would execute the executable file;
    extract execution features from the execution of the executable file, the execution features corresponding to characteristics of the execution of the executable file;
    apply an execution model to the extracted execution features, the execution model to determine whether an executable file is malicious based on execution features of the executable file and
    transmit processing instructions to the network traffic hub based on the determination of whether the execution file is malicious.

12. The non-transitory computer-readable medium of claim 11, further comprising instructions that cause the processor to:
    receive a network communication associated with the executable file; and
    extract the executable file from the network communication.

13. The non-transitory computer-readable medium of claim 11, wherein the execution model comprises a machine-learned model.

14. The non-transitory computer-readable medium of claim 13, wherein the execution model is trained based on execution features of a set of known-non-malicious executable files.

15. The non-transitory computer-readable medium of claim 11, wherein the instructions for applying the execution model to the execution features further cause the processor to generate a confidence score based on the execution features, the confidence score representing a confidence of the execution model that the executable file is malicious.

16. The non-transitory computer-readable medium of claim 15, wherein the instructions further cause the processor to compare the confidence score to a threshold confidence score.

17. The non-transitory computer-readable medium of claim 11, further comprising instructions that cause the processor to, responsive to determining that the executable file is malicious, transmit processing instructions to the network traffic hub to block the executable file from being downloaded by the networked device.

18. The non-transitory computer-readable medium of claim 11, further comprising instructions that cause the processor to, responsive to determining that the executable file is not malicious, transmit processing instructions to the network traffic hub to allow the executable file to be downloaded by the networked device.

* * * * *